Patented Dec. 7, 1948

2,455,508

UNITED STATES PATENT OFFICE 2,455,508

FOOD PRODUCT

Eugene Lilly, Colorado Springs, Colo.

No Drawing. Application December 7, 1945,
Serial No. 633,531

1 Claim. (Cl. 99—111)

This invention relates to food products, and more particularly to a food product having as its principal ingredient smoked rainbow trout or the like.

Cold water trout and particularly the species commonly designated "rainbow trout," because of its distinctive markings, have a distinctive taste and flavor. The meat of such fish when properly smoked has an unusual, highly palatable flavor. However, due to some peculiar characteristics thereof, it is difficult to preserve the flavor of such meat for any period of time when conventional curing methods are used.

Among the objects of this invention are to provide a novel food product consisting of an edible paste, the principal ingredient of which is smoked rainbow trout or the like; to provide such a food product which has a distinctive and pleasing flavor; to provide such a food product which has excellent keeping and shipping qualities, more particularly when packed in cans or vacuum sealed containers; to provide such a food product which will retain its distinctive taste qualities over relatively long periods of time; to provide such a food product which is of a uniform consistency particularly adapted for hors d'oeuvres, canapes and the like; to provide a method particularly adapted to produce such a product; to provide such a method which may be closely controlled to produce the desired results; and to provide such a method and product wherein certain of the constituents may be changed in the event that some of the constituents are not available on the market.

Preliminary to carrying out the method of this invention, the rainbow trout or the like must first be taken, either from a stream or from the ponds of a trout farm. Best results are obtained if the fish are processed promptly after removal from the water. After being cleaned, the fish are preferably cured in brine for about 24 hours and then smoked in a suitable smoke house, such as over hickory wood. The smoking process should be carried out very carefully, since, if the moisture in the meat is removed too quickly, the meat tends to fall to pieces and the trout fall off the hook or other support in the smoke house. Also, when a relatively long period of time is consumed in the smoking process, a superior flavor and consistency is obtained.

After smoking, the trout are removed from the smoke house and boned, preparatory to grinding. The smoked meat is fed into a suitable cutting or grinding device, such as a conventional type sausage silent cutter, such as the well-known "Boss Silent Cutter," and additional ingredients are mixed with the meat during grinding. The sequence of mixing appears to have an important bearing on the final result, although slight variations often will be found possible without producing any deleterious effect.

Thus, a butter-like shortening preferably is added to the meat, either as it is being fed into the grinder or immediately subsequent thereto. The term "butter-like shortening," as used herein, refers to butter, vegetable oil such as corn oil, and cream (from cow's milk), or a mixture or combination of two or more of the same. The best results have been obtained with a combination of butter and whole milk, although highly satisfactory results can be obtained with a combination of butter and corn oil. At or about the same time that the butter-like shortening is added, corn flour, together with flavoring such as salt and pepper, also are added. The butter-like shortening and flour are intimately intermixed with the meat during the grinding process, as are also whole whipped eggs added during grinding and preferably subsequent to the addition of the butter-like shortening and flour.

By utilizing the aforesaid grinding action, the several ingredients are so reduced, intermixed, and distributed, one within the other, that the final product apparently has no segregation of individual ingredients, but becomes a fluent mass of substantially uniform consistency throughout. While I prefer to utilize the meat grinding stage to attain this effect, it will be apparent that other mixing actions may be used to attain the same result, and so long as the uniform consistency is attained, which I term "an intimate intermixture" in this specification, the requirements of my invention will be served.

While it is possible to change the proportions of the ingredients, a superior product is produced by utilizing, for each 12 pounds of smoked rainbow trout meat, about 1½ pounds of corn flour and about 4½ pounds of whole whipped eggs. A minor quantity of seasoning, such as about 21 teaspoons of pepper, and salt to taste, also may be added. When butter can be utilized as the butter-like shortening, I prefer to mix 5½ pounds butter with about 4 pounds whole milk to give it fluidity, although a mixture of 6 pounds of 40% cream and about 2½ pounds of butter is a satisfactory substitute. In lieu thereof, satisfactory results may be obtained with about 3 pounds of butter and 2½ pounds of corn oil, for each 12 pounds of smoked rainbow trout meat.

After mixing and grinding, the intimate intermixture is packed into containers, such as cans, which are adapted to be evacuated and sealed. The cans are run through a heated exhaust box for reducing the pressure to a point below atmospheric, and then sealed. The sealed cans are then heated for a suitable period of time, as in a steam retort. When mixed and ready for filling into the cans, the product is relatively thin and soupy, but after heating in the exhaust box and retort, a substantially solidified paste is produced.

While butter or butter combinations preferably are utilized as the butter-like shortening, good results have been obtained with the foregoing combinations of butter and cream, or butter and corn oil. Also, tests made in which a butter-like shortening was omitted resulted in a decidedly inferior product. In additional tests, ordinary wheat flour produced a product in which the oil in the paste settled out from the remainder of the paste constituents, whereas corn flour, such as "Griffith's Process Flour" which is a special gelatinous flour processed from select maize, produced a product wherein there was no apparent tendency for the oil to separate out. Thus, the corn flour, in addition to the food value it possesses, has the property of an absorbent for the "butter-like" shortening, which assists in the formation of the final product of uniform consistency. The keeping qualities of the corn-bearing product, both from the standpoint of storage and transportation, were far superior and this product was superior in taste and apeparance. Furthermore, additional tests indicated that the use of eggs was important. Without the eggs, the paste was heavy, coarse, and unattractive. While the eggs could be separated and added without beating or whipping to attain fairly good results, further tests demonstrated that better results were obtained with whole, beaten eggs.

The time of heating or cooking is important only in that a minimum time of heating is necessary, and as long as a minimum time was exceeded, good results were obtained. Thus, the time of heating may vary, but good results have been obtained by utilizing an evacuation period of 3 to 5 minutes. The evacuating box may be maintained at a temperature of around 160-180 degrees F., and the sealed cans may remain in the steam heated retort for a period of about ¾ hours.

The food product prepared in the above manner, and having constituents of the type and preferably of the proportions outlined above, while rich in food value, has the distinctive and pleasing flavor of rainbow trout meat, modified somewhat by the smoking. The paste has excellent keeping qualities, since it can be stored for long periods and shipped at ordinary temperatures without appreciable change in the flavor or consistency of the product. Also, when made in the preferred manner, the paste retains its uniformity of composition and texture, as well as its highly pleasing flavor, even after storage over relatively long periods of time.

Best results, to date, in carrying out this invention have been obtained by using rainbow trout grown in cold water ponds and smoked over hickory blocks and shavings obtained from Arkansas. However, the principles of this invention may be applied to other trout, such as Eastern Brook trout, German Brown trout, and other species. The term "rainbow trout or the like" has been used in this specification to designate the several varieties of fish suited for this purpose.

From the foregoing, it will be evident that the method and product of this invention fulfills to a marked degree the objects and requirements hereinbefore set forth. It will be understood that variations from the preferred formula may be made, and also that additional changes, both in the method and constituents of the product, may be made without departing from the spirit and scope of this invention as set forth in the hereunto appended claim.

What is claimed is:

A method of making and packaging an edible paste food product from smoked meat of rainbow trout, which comprises grinding said meat; adding for each 12 pounds of meat about 5½ pounds of butter, 1½ pounds of corn flour, and flavoring during grinding; then adding about 4½ pounds of whole whipped eggs for each 12 pounds of meat during continued grinding to form an intimate intermixture thereof; packing the intimate intermixture in a container; exhausting and then sealing each said container; and then heating each said container for about 45 minutes, the corn flour being an absorbent for the butter and preventing settling out of the same.

EUGENE LILLY.

REFERENCES CITED

The following references are of record in the file of this patent:

UNITED STATES PATENTS

| Number | Name | Date |
| --- | --- | --- |
| 143,386 | Sharp | Sept. 30, 1873 |
| 1,164,034 | Thorsen | Dec. 14, 1915 |
| 1,174,635 | Stafford | Mar. 7, 1916 |
| 1,229,472 | Julien | June 12, 1917 |

OTHER REFERENCES

"Method For Smoking Fish In The Southern States, With Recipes For Cooking," July 17, 1933, by Norman D. Jarvis, published by the Dep't. of Commerce, Bureau of Fisheries, Washington, Mem. S-331, pages 4 and 5.

"Practical Fish Cookery," 1935, by Webster and Conn, published by the U. S. Dep't. of Commerce, Bureau of Fisheries, Fishery Circular No. 19, pages 12, 13, and 20.